United States Patent

Yoshikawa et al.

[11] Patent Number: 5,990,605
[45] Date of Patent: Nov. 23, 1999

[54] ELECTRON EMISSION DEVICE AND DISPLAY DEVICE USING THE SAME

[75] Inventors: Takamasa Yoshikawa; Kiyohide Ogasawara; Hiroshi Ito; Masataka Yamaguchi; Shingo Iwasaki; Nobuyasu Negishi; Takashi Chuman, all of Tsurugashima, Japan

[73] Assignee: Pioneer Electronic Corporation, Tokyo, Japan

[21] Appl. No.: 09/044,819

[22] Filed: Mar. 20, 1998

[30] Foreign Application Priority Data

Mar. 25, 1997 [JP] Japan ..................................... 9-071864
Mar. 25, 1997 [JP] Japan ..................................... 9-071865

[51] Int. Cl.$^6$ ..................................................... H01J 1/05
[52] U.S. Cl. ........................... 313/310; 313/309; 445/46; 445/51
[58] Field of Search .................... 313/310, 309, 313/336, 351; 445/51, 46

[56] References Cited

U.S. PATENT DOCUMENTS 5,652,474  7/1997  Wilshaw et al. ........................ 313/309
5,894,189  4/1999  Ogasawara et al. .................... 313/310

*Primary Examiner*—Nimeshkumar D. Patel
*Assistant Examiner*—Joseph Williams
*Attorney, Agent, or Firm*—Perman & Green, LLP

[57] ABSTRACT

An electron emission device includes: a semiconductor layer; a porous semiconductor; and a thin-film metal electrode which are layered in turn. The electrode faces a vacuum space. The porous semiconductor layer has at least two or more of porosity-changed layers which have porosities which are different from each other in the thickness direction. The electron emission device emits electrons when an electric field is applied between the semiconductor layer and the thin-film metal electrode. An insulator layer made of a material selected from silicon oxide or silicon nitride may be formed between the porous semiconductor layer and the thin-film metal electrode. Si skeletons of the porous semiconductor layer are oxidized or nitrided.

11 Claims, 7 Drawing Sheets

ELECTRON EMISSION DEVICE AND DISPLAY DEVICE USING THE SAME

BACKGROUND OF THE INVENTION

1. Field of the Invention

The present invention relates to an electron emission device and particularly to a porous semiconductor electron emission device.

2. Description of the Related Art

In field electron emission display apparatuses, an FED (Field Emission Display) is known as a planar emission display device equipped with an array of cold-cathode electron emission source which does not require cathode heating. There also exists attentions to planar electron sources such as an electron emission device with a metal-insulator-metal (MIM) structure and to an electron emission device using a porous semiconductor such as silicon (Si) with a homogeneous porosity.

As shown in FIG. 1, the electron emission device using a porous semiconductor layer comprises a porous semiconductor layer 13 and a thin-film metal electrode 15 which are formed in turn on a silicon layer 12 provided with an ohmic electrode 11 at the back side.

The porous semiconductor electron emission device can be regarded as a diode of which the thin-film metal electrode 15 at its surface is connected to a positive potential Vps and the back i.e., ohmic electrode 11 is connected to a ground potential. When the voltage Vps is applied between the ohmic electrode 11 and the thin-film metal electrode 15 to supply electrons into the semiconductor layer 12 of semiconductor Si, a diode current Ips flows. Since the porous semiconductor layer 13 has a high resistance, most of the applied electric field is applied to the porous semiconductor layer 13. The electrons travel inside the porous semiconductor layer 13 toward the thin-film metal electrode 15. Some of the electrons that reach near the thin-film metal electrode 15 tunnel through the thin-film metal electrode 15, due to the strong electric field, to be discharged out into the vacuum space 4. The electrons e (emission current Iem) discharged from the thin-film metal electrode 15 by the tunnel effect are accelerated by a high voltage Vc, which is applied to an opposing collector electrode (transparent electrode) 2, and is collected at the collector electrode 2. If a fluorescent substance is coated on the collector electrode 2, corresponding visible light is emitted.

To fabricate a color display panel using the porous semiconductor electron emission device, the collector electrodes 2 capturing emitted electrons are grouped per three for R, G and B color signals corresponding to Red, Green and Blue emitting portions. Thus, fluorescent material layers 3R, 3G and 3B corresponding to R, G and B emissions are formed on the corresponding collector electrodes 2 onto which the electrons caused by the tunnel effect are impinged after the travel in the vacuum space 4.

However, there are problems as follows:

(1) When the diode current Ips is in an over-current, the electron emission efficiency η (emission current Iem/diode current Ips) decreases;

(2) The surface of the porous semiconductor layer is considerably rough, and its contact to thin-film metal electrode prepared later becomes defective, so that the electron emission becomes unstable in the element.

(3) Since the thermal conductivity of the porous semiconductor layer of Si is low in comparison with that of the original silicon, heat destruction of the element tends to occur.

On the other hand, the porous silicon layer is formed by anodization to a silicon film in a mixed solution of hydroflouric acid and ethyl alcohol.

By heating the porous silicon layer at a high temperature in a vacuum after the anodization thereof, hydrogen terminuses existing adjacent to the surface of the porous silicon layer are removed, and then dangling bonds are terminated with atoms of oxygen or nitrogen through some processes such as heating or plasma-processing in oxygen gas or nitrogen gas, so that the porous silicon layer becomes stable.

However, even by use of the above termination method, there is a difficulty to control the thickness of the portion terminated with oxygen and nitrogen in the porous silicon layer. Optimization of terminus processing conditions is because it is hard. Therefore, since the porous silicon portion terminated with oxygen and nitrogen is an important condition for electroluminescence (EL) and photoluminescence (PL), any uniform stable EL and PL light-emissions are not yet obtained from the porous semiconductor electron emission device.

SUMMARY OF THE INVENTION

Thus, the present invention has been made to solve such a problem in view of the forgoing status. Therefore an object of the present invention is to provide an electron emission device with a stable EL and PL light-emission.

It is another object of the present invention is to provide an electron emission device with a high electron emission efficiency.

In a first aspect to the invention, an electron emission device comprises:

a semiconductor layer for supplying electrons;

a porous semiconductor layer formed on the semiconductor layer; and a thin-film metal electrode which is formed on the porous semiconductor layer and faces a vacuum space; wherein the porous semiconductor layer has at least two or more of porosity-changed layers which have porosities which are different from each other in the thickness direction, whereby the electron emission device emits electrons when an electric field is applied between the semiconductor layer and the thin-film metal electrode.

According to the electron emission device of the invention with the above structure, a high electron emission efficiency is obtained. Therefore, this electron emission device, when in use in a display device, can provide a high luminance, can suppress the consumption of the drive current and the generation of heat from the device, and can reduce a load on the driving circuit.

In an embodiment of the electron emission device of the invention, the porosity-changed layer with a high porosity and another porosity-changed layer with a low porosity are layered by turns in the thickness direction of the porous semiconductor layer.

In another embodiment of the electron emission device of the invention, the porosity-changed layers have incline porosity ascended gradually in the thickness direction. Alternatively, the porosity-changed layers have incline porosity descended gradually in the thickness direction.

In further another embodiment of the electron emission device of the invention, the porous semiconductor layer is formed by an anodization processing to the surface of the semiconductor layer to be made as a porous portion.

In still further another embodiment of the electron emission device of the invention, the semiconductor layer is anodic-oxidized from the surface thereof during a processing time in which a current density for the anodization processing is changed so that the porosity-changed layers have incline porosities in the thickness direction.

In an embodiment of the electron emission device of the invention, the semiconductor layer is anodic-oxidized from the surface thereof in such a manner that a first processing time duration in which a low current density for the anodization processing is applied to the surface and a second processing time duration in which a high current density for the anodization processing is applied to the surface are repeated by turns, so that the porosity-changed layer with a high porosity and another porosity-changed layer with a low porosity are layered by turns in the thickness direction of the porous semiconductor layer.

According to the electron emission device of the invention, since the porous surface of the porous semiconductor layer becomes a smoothed flat and the contact area with the surface of the thin-film metal electrode increases, the electron emission is stabilized. In addition, since a high density layer with a low porosity exists in the inside of the porous semiconductor layer, the rate of thermal conductivity increases in the layer and the thermal destruction of device comes to seldom occur due to a heat-dissipation effect.

In a second aspect to the invention, an electron emission device comprises:

a semiconductor layer for supplying electrons;

a porous semiconductor layer formed on the semiconductor layer;

an insulator layer formed on the porous semiconductor layer and made of a material selected from silicon oxide or silicon nitride; and a thin-film metal electrode which is formed on the insulator layer and faces a vacuum space; whereby the electron emission device emits electrons when an electric field is applied between the semiconductor layer and the thin-film metal electrode.

In an embodiment of the electron emission device of the invention, the porous semiconductor layer is formed by an anodization processing to the surface of the semiconductor layer to be made as a porous portion.

In another embodiment of the electron emission device of the invention, dangling bonds of the porous semiconductor layer are terminated by oxygen or nitrogen.

In a third aspect to the invention, an electron emission device comprises:

a semiconductor layer for supplying electrons;

a porous semiconductor layer formed on the semiconductor layer; and a thin-film metal electrode which is formed on the porous semiconductor layer and faces a vacuum space; wherein skeletons of the porous semiconductor layer are oxidized or nitrided, whereby the electron emission device emits electrons when an electric field is applied between the semiconductor layer and the thin-film metal electrode.

In an embodiment of the electron emission device of the invention, the porous semiconductor layer is formed by an anodization processing to the surface of the semiconductor layer to be made as a porous portion.

According to the electron emission device of the invention with the above structure, a high electron emission efficiency is obtained. Therefore, this electron emission device, when in use in a display device, can provide a high luminance, can suppress the consumption of the drive current and the generation of heat from the device, and can reduce a load on the driving circuit.

In the embodiment of the electron emission device of the invention, the insulator layer of silicon oxide or silicon nitride is provided between the porous semiconductor layer and the thin-film metal electrode, and alternatively skeletons of the porous semiconductor layer are oxidized or nitrided, and alternatively the combination of the insulator layer and the oxidized or nitrided porous semiconductor layer may be preformed. Therefore, the electron emission of the device is stabilized.

This electron emission device according to the invention can serve as a light-emitting diode or a laser diode which emits electromagnetic waves of infrared rays, visible light or ultraviolet rays.

DETAILED DESCRIPTION OF THE PREFERRED EMBODIMENTS

Preferred embodiments according to the present invention will be described in more detail with reference to the accompanying drawings.

Figure 1:
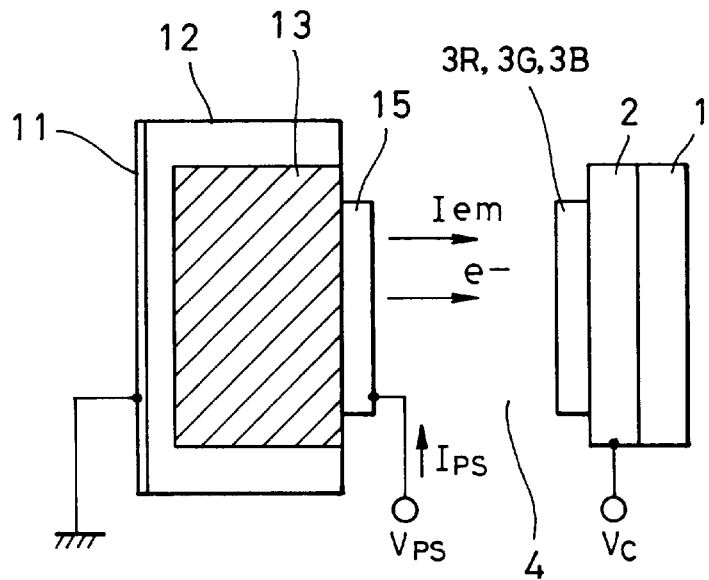
FIG. 1 is a schematic cross-sectional view of an electron emission device.
Figure 2:
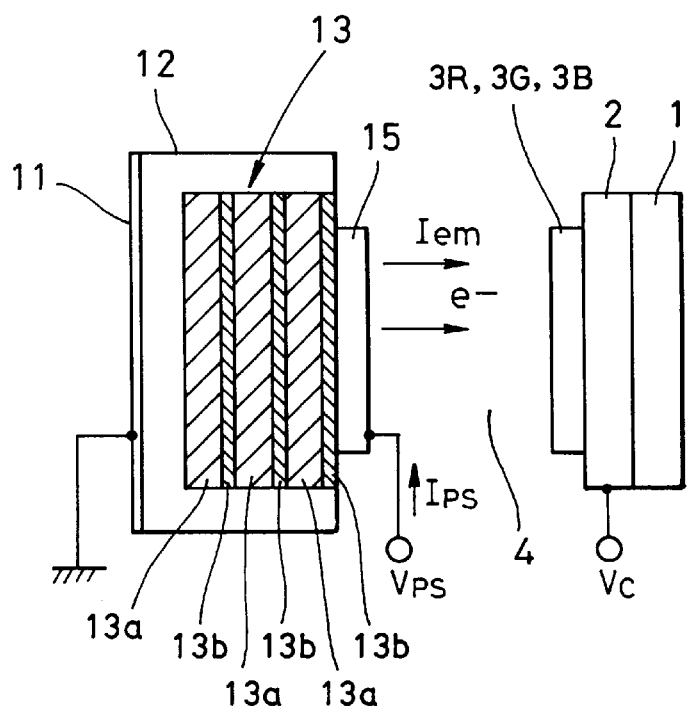
FIG. 2 is a schematic cross-sectional view of an electron emission device of an embodiment according to the invention.

As shown in FIG. 2, an electron emission device embodying the invention has a semiconductor layer 12 of a Si substrate for supplying electrons. An ohmic electrode 11 is formed on the Si substrate at the back side. The electron emission device further has a porous semiconductor layer 13 which is formed by an anodic oxidation of the Si semiconductor layer. A thin-film metal electrode 15 is layered on the porous semiconductor layer 13 so as to face a vacuum space. The electron emission device emits electrons when an electric field is applied between the semiconductor layer and the thin-film metal electrode.

The porous semiconductor layer 13 consists of at least two or more of porosity-changed layers 13a and 13b which have porosities different from each other respectively in the thickness direction. As for the whole, the porous semiconductor layer 13 has a thickness ranging of from 1 to 50 micrometers.

As shown in FIG. 2, the porous semiconductor layer 13 is formed so that a porosity-changed layer with a high porosity 13a and a porosity-changed layer with a low porosity 13b may be alternately layered by in the thickness direction. The porosity-changed layer with a high porosity 13a has an electrical resistance lower than that of the porosity-changed layer with a low porosity 13b, because the low porosity-changed layer 13b has a dense Si skeleton with a high density in comparison with the high porosity-changed layer 13a.

In addition, the high porosity-changed layer 13a and/or low porosity-changed layer 13b may be formed in such a manner that each may have an incline porosity gradually ascended in the thickness direction. Alternatively the incline porosity may be gradually descended in the thickness direction.

Thus, the change in porosity is given into the porous semiconductor layer 13. The porosity-changed layer with a low porosity 13b with a high resistance should be flatly formed on the outer-most surface. The low porosity-changed layer 13b prevents a superfluous current of the diode current Ips, and improves the contact with the thin-film metal electrode 15 formed thereon. Moreover, since the porosity-changed layer with a low porosity 13b is layered by turns, the thermal dissipation of the device will be promoted.

To repeatedly form the lamination combination of the high and low porosity-changed layers 13a and 13b will control the superfluous current of the diode current Ips, and will raise the heat-dissipation effect further, although the above-mentioned effects are obtained by using at least one set of lamination of the high and low porosity-changed layers 13a and 13b.

The electron emission device emits electrons although the thin-film electrode of metal such as Pt is simply prepared on the low porosity-changed layer 13b. Alternatively, after anodization for making pores on the semiconductor layer, oxidization or nitriding may be performed on the resulted porous semiconductor layer under the following conditions and, after that, the thin-film electrode of metal such as Pt is prepared, so that an emission stability and durability of the device are improved more.

The porous semiconductor layer may be oxidized under the oxidization conditions of a temperature ranging from 700 to 1200 degrees Centigrade and a time period of form 1 to 120 minutes in oxygen gas, alternatively under the oxidization conditions of a temperature ranging from 200 to 900 degrees Centigrade and a time period of form 1 to 120 minutes in oxygen plasma. The porous semiconductor layer may be nitrided under the nitriding conditions of a temperature ranging from 700 to 1200 degrees Centigrade and a time period of form 1 to 120 minutes in nitrogen gas, alternatively under the nitriding conditions of a temperature ranging from 200 to 900 degrees Centigrade and a time period of form 1 to 120 minutes in nitrogen plasma.

In addition, a Si wafer of a single-crystalline, amorphous, poly-crystalline, n-type or p-type may be used for a device-substrate in which the porous Si layer is formed through the anodization. Alternatively, the thin Si layer may be deposited on the ohmic electrodes previously formed on a substrate. This case is convenient to a display device comprising a plurality of electron emission devices.

Although sputtering is particularly effective in forming those layers and the substrate, vacuum deposition method, CVD (Chemical Vapor Deposition), laser ablation method, MBE (Molecular Beam Epitaxy) and ion beam sputtering are also effective.

The material of the semiconductor layer 12 preferably used is silicon (Si), but not restricted in the present invention. In addition to the semiconductor layer of silicon, there may be used for the semiconductor layer 12 semiconductor materials capable of being treated by means of an anodic treatment method, for example, a single substance or compound semiconductor of Group IV, Group III–V or Group II–VI such as germanium (Ge), silicon carbide (SiC), gallium arsenide (GaAs), phosphoric indium (InP), cadmium selenide (CdSe). When employing the crystalline for the Si layer 12, the crystal substrate having its surface (100) direction orientating perpendicular to its major surface is preferably used, because the electron emission efficiency η of the porous Si layer is better. It is estimated that such a (100) Si layer provides the Si crystalline direction and minute pore channels with a nano-order diameter which orientate perpendicular to its major surface. In addition, the employment of the porous Si layer made from the amorphous Si layer provides amorphous residual Si skeletons and minute channels.

The porous semiconductor layer 13 is formed in the semiconductor wafer 12 through the anodic treatment. For example, a semiconductor wafer 12 of an n-type Si is preformed by an anodic treatment, in which an insulative layer with a rectangle opening is previously formed on the semiconductor wafer. The semiconductor wafer is then dipped into a hydrogen fluoride (HF) solution bath. The surface of the semiconductor layer is partially exposed in the HF solution through the opening of the insulative layer. The exposed semiconductor layer as an anode and the cathode of Pt are disposed facing to each other in the HF solution. The anode and cathode are connected to a DC power supply, so that a DC current is applied across these electrodes with a low current density to anodize the exposed semiconductor layer. As a result, a p-type porous Si layer is formed in the Si substrate. In this embodiment, the formation of the porous structure requires the consumption of positive holes and thus the light-irradiation should be preformed during the anodization to supply the positive hole carriers to the exposed semiconductor layer. Alternatively, the porous Si layer may be formed on a p-type Si semiconductor layer. In this case, the porous Si layer may be formed even if it is in a dark condition.

The porous Si layer is consisted of plural minute channels or open spaces and the residual Si. When the pore channel's diameter is in a range from approximately one to several hundreds nano-meters and the dimension of each residual Si skeleton is in a range from the number of tens to hundreds of Si atoms, it is expected that an electron emission phenomenon occurs due to the quantum size effect. These values may be controlled by the settings of the conditions of the HF density, the current density, the duration of anodization treatment and the light-irradiation time period during the anodic treatment.

Figure 6A:
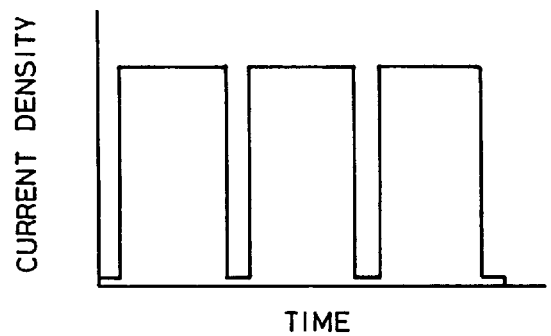
FIGS. 6A, 6B, 6C and 6D are graphs each illustrating a relationship between the current density and the processing period during the anodic oxidation treatment for fabricating an electron emission device of an embodiment according to the invention.
Figure 6B:
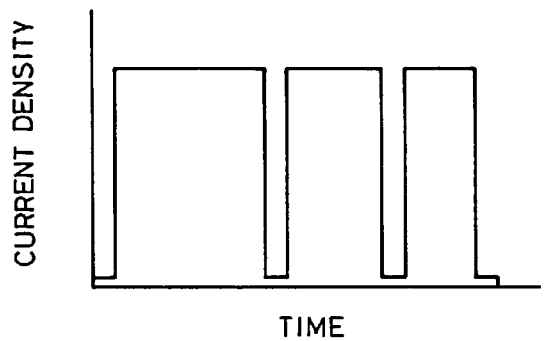

By controlling the current density and the processing period in the anodizing treatment of the semiconductor layer, the porosity is changed at 10 to 80% in the thickness direction of the porous semiconductor layer 13 having the porosity-changed layers 13a and 13b. This change of porosity is preformed in each porosity-changed layer. For example, the porosity-changed layers 13a and 13b formed by turns in such a manner that anodizations both of the short processing period with a low current density and of the long processing period with a high current density are repeated by turns, as shown in FIGS. 6A and 6B, so that the internal diameter of the minute pore channel adjacent to the surface of the porous Si layer becomes comparatively small (i.e., the porosity-changed layer 13b), but such internal diameter of the pore channel increases as its depth becomes deeper (i.e., the porosity-changed layer 13a). In this case, the long processing periods with a high current density are equal to each other for forming the porosity-changed layers with a high porosity 13a intermittently, as shown in FIG. 6A. The long processing periods with a high current density may be gradually made short for forming the high porosity-changed layers 13a becoming thin gradually, as shown in FIG. 6B.

Figure 6C:
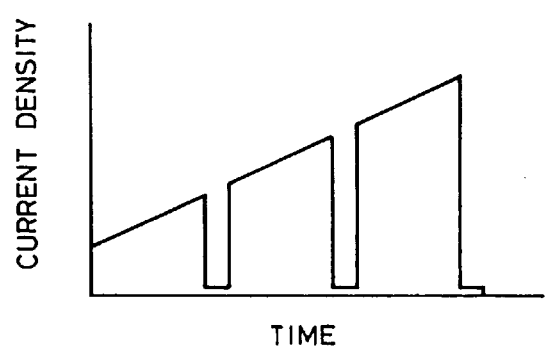
Figure 6D:
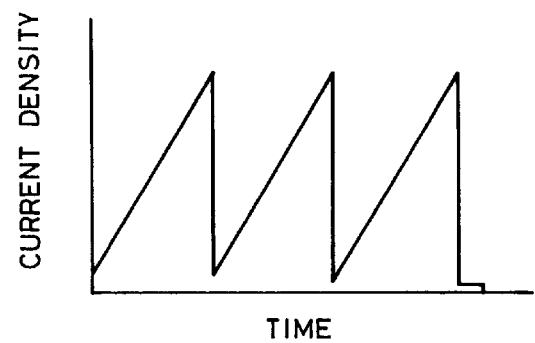

Moreover, at least two or more of the porosity-changed layers each having a porosity different from the contiguities in the thickness direction can also be formed in the porous semiconductor layer by means of anodizations under the conditions of the current densities and the processing periods as shown in FIGS. 6C and 6D. By controlling the current densities and processing periods, the specific resistance becomes small so that it is close to the Si layer 12 in each layer. There are a gradual slope of porosity proportional to the resistivity in each porosity-changed layer 13a formed by the anodization as shown in FIG. 6C or 6D. For porosity slope of the thickness direction in the porous silicon layer, the current density is gradually changed during the anodization. The porous Si layer 13 may have a high resistivity at a portion adjacent to its surface and a low resistivity at a portion adjacent to its interface between the porous Si layer 13 and the Si substrate 12. This continuous incline of resistivity in the porous Si layer 13 is preferable for the injection of electrons from the substrate.

Although metals such as Pt, Au, W, Ru and Ir are effective as the material for the thin-film metal electrode 15 on the electron emission side, Al, Sc, Ti, V, Cr, Mn, Fe, Co, Ni, Cu, Zn, Ga, Y, Zr, Nb, Mo, Tc, Rh, Pd, Ag, Cd, Ln, Sn, Ta, Re, Os, Tl, Pb, La, Ce, Pr, Nd, Pm, Sm, Eu, Gd, Tb, Dy, Ho, Er, Tm, Yb, Lu and an alloy of individuals thereof can be used as well. From the principle of electron emission, it is better that the material for the thin-film metal electrode 15 has a lower work function $\phi$ and is thinner. To increase the electron emission efficiency, the material for the thin-film metal electrode 15 should be a metal of the group I or group II in the periodic table; for example, Cs, Rb, Li, Sr, Mg, Ba, Ca and the like are effective and alloys of those elements may be used as well. To make the thin-film metal electrode 15 very thin, the material for the thin-film metal electrode 15 should be a chemically stable metal with a high conductivity; for example, single substances of Au, Pt, Lu, Ag and Cu or alloys thereof are desirable. It is effective to coat or dope a metal with a low work function as described above on or in those metals. Utilizable efficiency is obtained by using an Au or Pt thin-film electrode having a thickness of from 1 to 50 nm. When considering the stability as an electron emission device, a thickness of from 2 to 20 nm is the most suitable for the Au or Pt thin-film electrode.

The material for the ohmic electrodes 11 is Au, Pt, Al, W or the like which is generally used for the wires of an IC, and has a uniform thickness for supplying substantially the same current to the individual devices.

The material for another device-substrate (not shown) on which the semiconductor Si layer 12 is deposited as a thin-film may be ceramics such as $Al_2O_3$, $Si_3N_4$ or BN instead of glass.

(Primary Example)

Concretely, the electron emission devices were produced from Si wafers of 14 mm×14 mm, and their characteristic were investigated.

While the current density and the processing period of anodization were changed in the anodization method using the Si wafer, the processing of the short time for which current density was reduced was performed intermittently. As a result, the thin porosity-changed layers were formed in the porous semiconductor layer of the Si wafer, in each of which the average pore diameter was 1/20 and the average number of pores was 400 times per centimeter square in comparison with that of the conventional device. The anodization conditions were as follows:

(Anodization Conditions)

Ingredients of the electrolytic solution (temperature):
HF:Ethanol=1:1 (at 0 degree Centigrade)

Current density and processing period:
A set of (2.5 $mA/cm^2$ for 2 seconds and 50 $mA/cm^2$ for 10 seconds) times 3 equals a total of 36 seconds.

Thickness of the porous semiconductor layer:
A set of (porosity-changed layers of 0.016 $\mu m$ and 1.67 $\mu m$ thick) times 3 equals a total of 5.058 $\mu m$ thick.

(Comparative Example)

The same electron emission device was produced as comparative examples in such a manner as the above-mentioned case except having a conventional porous silicon layer with a uniform porosity. At this case, it carried out under the following anodization conditions.

(Anodization Conditions)

Ingredients of the electrolytic solution (temperature):
HF:Ethanol=1:1 (at 0 degree Centigrade)

Current density and processing period:
It is 50 $mA/cm^2$ constant for a whole period.

processing period: 30 seconds

Thickness of the porous semiconductor layer: 5 $\mu m$

An ohmic electrode was formed at the back side of each Si wafer after anodized.

Finally, a 6 mm diameter thin-film metal electrode of Pt was formed 6 nm thick on the surface of the amorphous $SiO_2$ layer of each substrate by sputtering, thus providing a plurality of device-substrates.

Meanwhile, transparent substrates were prepared, each of which has a collector electrode of indium tin oxide (ITO) formed inside a transparent glass substrate and has a fluorescent layer of a fluorescent substance corresponding to R, G or B color emission formed on the collector electrode by the normal scheme.

Electron emission devices were assembled in each of which the device-substrate and the transparent substrate are supported apart from one another by 10 mm in parallel by a spacer in such a way that the thin-film metal electrode 15 faced the collector electrode 2, with the clearance therebetween made to a vacuum of $10^{-5}$ Pa.

(Results)

Then, the diode current Ips and the emission current Iem corresponding to the thickness of the $SiO_2$ film of each of the acquired plural devices were measured.

Figure 3:
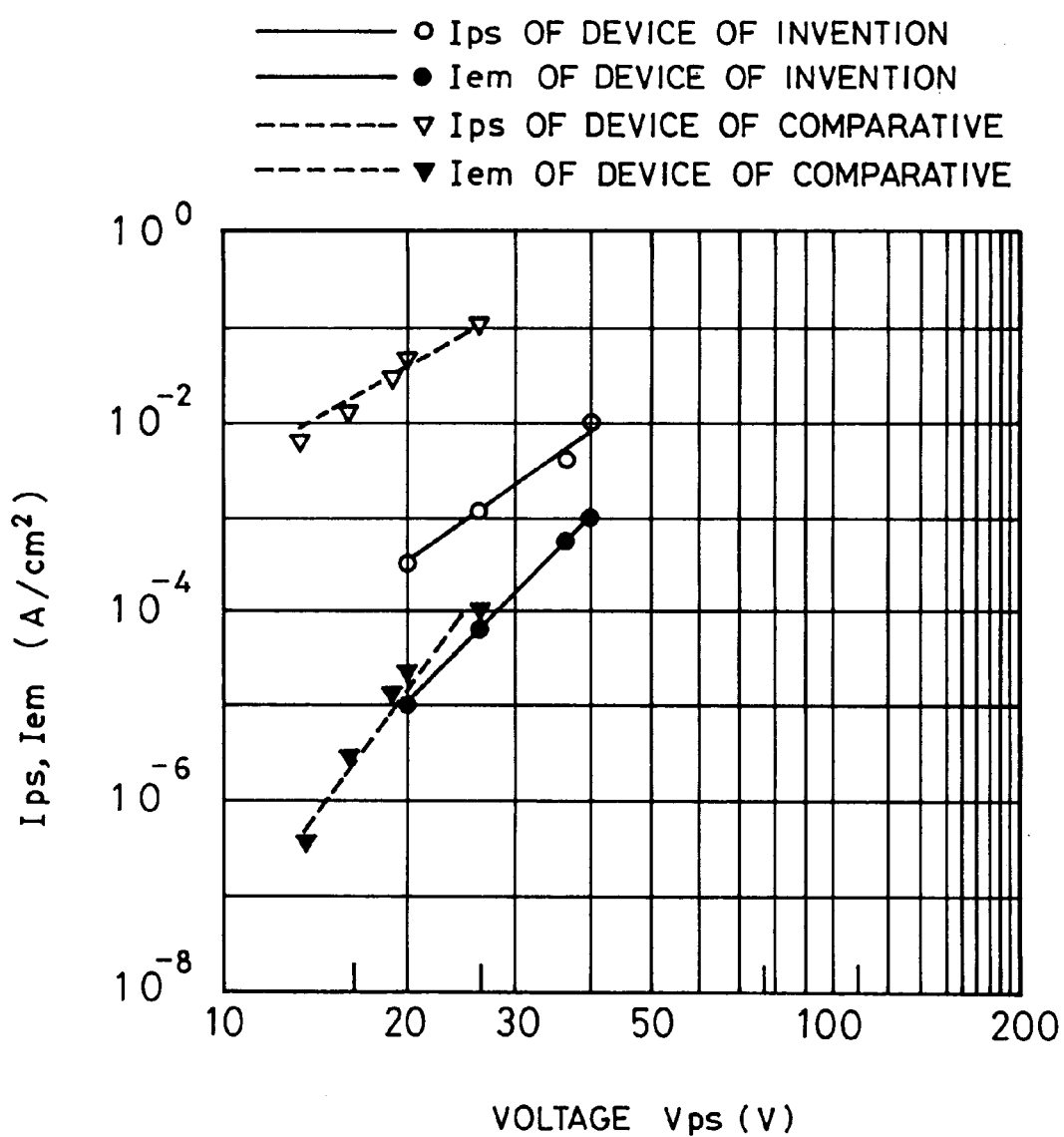
FIG. 3 is a graph illustrating relationships of both the diode current Ips and the emission current Iem with respect to the driving voltage Vps applied for driving the electron emission device together with that of a comparative electron emission device.

This result is shown in FIG. 3. As for the device of the invention, as seen from the figure, only the diode current Ips was restricted, without carrying out an emission current Iem fall, and electron emission efficiency η improved from $10^{-3}$ to $10^{-2}$ no less than 2 figures in comparison with that of the conventional device.

Moreover, fluctuations of the emission current Iem of the electron emission devices both of the embodiment and the comparative example are measured when the voltage Vps of 20 V was applied to each device.

Change of discharge current Iem at the time of applying the voltage Vps of 20 V about both elements with the laspe of time was measured.

Figure 4:
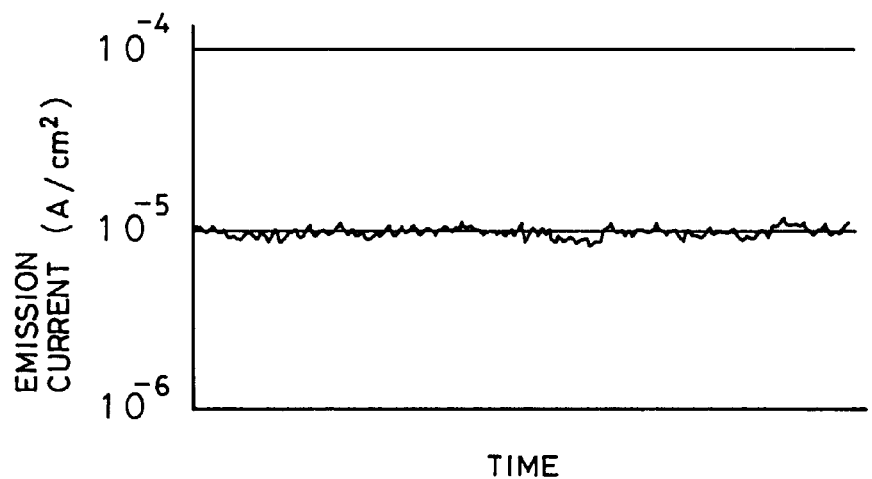
FIG. 4 is a graph illustrating a fluctuation of emission current with the lapse of time in the electron emission device of the embodiment.
Figure 5:
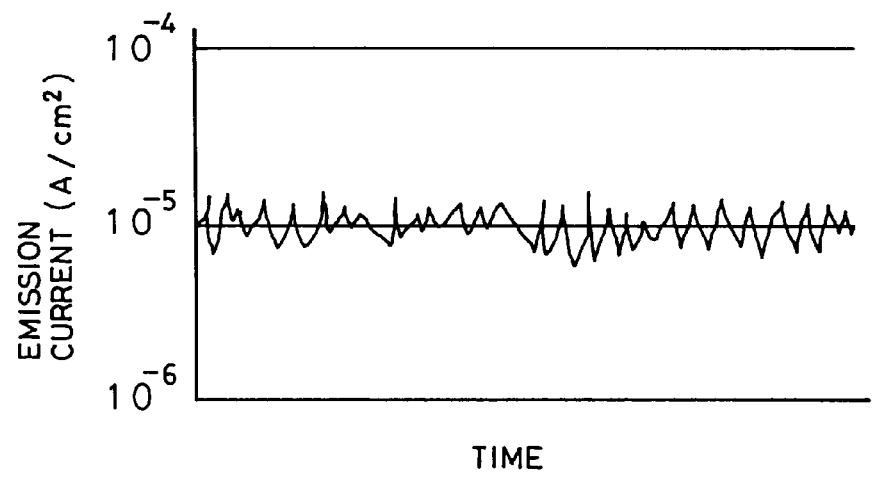
FIG. 5 is a graph illustrating a fluctuations of emission current with the lapse of time in a comparative electron emission device.

FIGS. 4 and 5 show the results of the devices of the embodiment and the comparative example. As apparent from these Figures, the electron emission device of the invention is restricted in the fluctuation of emission current to make the electron emission device stable, in comparison with that of the comparative example.

In addition, the electron emission device of the invention generally exhibits a uniform declining of temperature upon application of a constant voltage Vps, in comparison with that of the comparative example.

When a voltage of approximately 4 kV applied across the fluorescent-substance coated collector electrode and the thin-film metal electrode, a uniform fluorescent pattern corresponding to the shape of the thin-film metal electrode was observed in the devices. This shows that the uniform electron emission is caused by the porous semiconductor layer having at least two or more of porosity-changed layers which have porosities which are different from each other in the thickness direction and the emission exhibits a high linearity, and that those devices can serve as an electron emission diode, or a light-emitting diode or laser diode which emits electromagnetic waves of infrared rays, visible light or ultraviolet rays.

(Next Embodiments)

Other embodiments according to the invention will be described with reference to the accompanying drawings.

Figure 7:
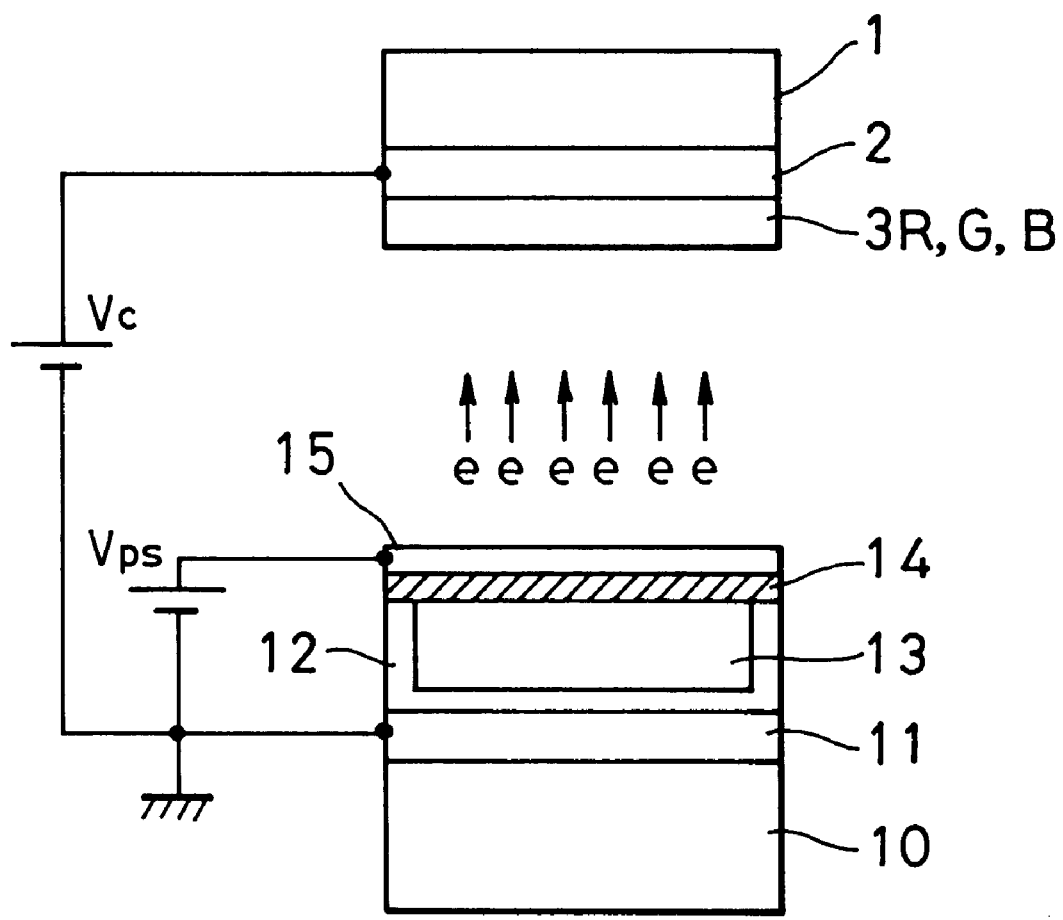
FIGS. 7 to 9 are schematic cross-sectional views each showing an electron emission device of another embodiment according to the invention.

As shown in FIG. 7, an electron emission device embodying the invention has an ohmic electrode 11 previously formed on a device-substrate 10 of glass. The electron emission device has also a semiconductor layer 12 of Si formed on the ohmic electrode to supply electrons to a layer formed later. The electron emission device further has a porous semiconductor layer 13 which is formed by an anodic oxidation of the Si semiconductor layer 12. The electron emission device further has an insulator layer 14 formed on the porous semiconductor layer and made of a material selected from oxides or nitrides, and also has a thin-film metal electrode 15 facing a vacuum space. A pair of a device-substrate 10 and a transparent substrate 1 are supported so as to face each other sandwiching a vacuum space therebetween. On the internal surface of the transparent substrate 1, a transparent collector electrode 2 and a fluorescent layer 3R, 3G or 3B of fluorescent substance are formed in turn. The electron emission device emits electrons when an electric field is applied between the semiconductor layer and the thin-film metal electrode. In an embodiment of the electron emission device, the insulator layer 14 made of silicon oxides or silicon nitrides is formed between the porous semiconductor layer 13 and the thin-film metal electrode 15 by means of a sputtering method.

In addition, a Si wafer of a single-crystalline, amorphous, poly-crystalline, n-type or p-type may be used for the Si layer to be made as porous through the anodization. Alternatively, the thin Si layer may be deposited on the ohmic electrodes previously formed on a substrate. This case is convenient to a display device comprising a plurality of electron emission devices.

Silicon oxide $SiO_x$ (wherein subscribed x represents an atomic ratio) is effective as a dielectric material for the insulator layer 14 and, metal oxides or metal nitrides such as $LiO_x$, $LiN_x$, $NaO_x$, $KO_x$, $RbO_x$, $CsO_x$, $BeO_x$, $MgO_x$, $MgN_x$, $CaO_x$, $CaN_x$, $SrO_x$, $BaO_x$, $ScO_x$, $YO_x$, $YN_x$, $LaO_x$, $LaN_x$, $CeO_x$, $PrO_x$, $NdO_x$, $SmO_x$, $EuO_x$, $GdO_x$, $TbO_x$, $DyO_x$, $HoO_x$, $ErO_x$, $TmO_x$, $YbO_x$, $LuO_x$, $TiO_x$, $TiN_x$, $ZrO_x$, $ZrN_x$, $HfO_x$, $HfN_x$, $ThO_x$, $VO_x$, $VN_x$, $NbO_x$, $NbN_x$, $TaO_x$, $TaN_x$, $CrO_x$, $CrN_x$, $MoO_x$, $MoN_x$, $WO_x$, $WN_x$, $MnO_x$, $ReO_x$, $FeO_x$, $FeN_x$, $RuO_x$, $OsO_x$, $CoO_x$, $RhO_x$, $IrO_x$, $NiO_x$, $PdO_x$, $PtO_x$, $CuO_x$, $CuN_x$, $AgO_x$, $AuO_x$, $ZnO_x$, $CdO_x$, $HgO_x$, $BO_x$, $BN_x$, $AlO_x$, $AlN_x$, $GaO_x$, $GaN_x$, $InO_x$, $SiN_x$, $GeO_x$, $SnO_x$, $PbO_x$, $PO_x$, $PN_x$, $AsO_x$, $SbO_x$, $SeO_x$, $TeO_x$ and the like can be used as well. Furthermore, metal complex oxides such as $LiAlO_2$, $Li_2SiO_3$, $Li_2TiO_3$, $Na_2Al_{22}O_{34}$, $NaFeO_2$, $Na_4SiO_4$, $K_2SiO_3$, $K_2TiO_3$, $K_2WO_4$, $Rb_2CrO_4$, $Cs_2CrO_4$, $MgAl_2O_4$, $MgFe_2O_4$, $MgTiO_3$, $CaTiO_3$, $CaWO_4$, $CaZrO_3$, $SrFe_{12}O_{19}$, $SrTiO_3$, $SrZrO_3$, $BaAl_2O_4$, $BaFe_{12}O_{19}$, $BaTiO_3$, $Y_3Al_5O_{12}$, $Y_3Fe_5O_{12}$, $LaFeO_3$, $La_3Fe_5O_{12}$, $La_2Ti_2O_7$, $CeSnO_4$, $CeTiO_4$, $Sm_3Fe_5O_{12}$, $EuFeO_3$, $Eu_3Fe_5O_{12}$, $GdFeO_3$, $Gd_3Fe_5O_{12}$, $DyFeO_3$, $Dy_3Fe_5O_{12}$, $HoFeO_3$, $Ho_3Fe_5O_{12}$, $ErFeO_3$, $Er_3Fe_5O_{12}$, $Tm_3Fe_5O_{12}$, $LuFeO_3$, $Lu_3Fe_5O_{12}$, $NiTiO_3$, $Al_2TiO_3$, $FeTiO_3$, $BaZrO_3$, $LiZrO_3$, $MgZrO_3$, $HfTiO_4$, $NH_4VO_3$, $AgVO_3$, $LiVO_3$, $BaNb_2O_6$, $NaNbO_3$, $SrNb_2O_6$, $KTaO_3$, $NaTaO_3$, $SrTa_2O_6$, $CuCr_2O_4$, $Ag_2CrO_4$, $BaCrO_4$, $K_2MoO_4$, $Na_2MoO_4$, $NiMoO_4$, $BaWO_4$, $Na_2WO_4$, $SrWO_4$, $MnCr_2O_4$, $MnFe_2O_4$, $MnTiO_3$, $MnWO_4$, $CoFe_2O_4$, $ZnFe_2O_4$, $FeWO_4$, $CoMoO_4$, $CoTiO_3$, $CoWO_4$, $NiFe_2O_4$, $NiWO_4$, $CuFe_2O_4$, $CuMoO_4$, $CuTiO_3$, $CuWO_4$, $Ag_2MoO_4$, $Ag_2WO_4$, $ZnAl_2O_4$, $ZnMoO_4$, $ZnWO_4$, $CdSnO_3$, $CdTiO_3$, $CdMoO_4$, $CdWO_4$, $NaAlO_2$, $MgAl_2O_4$, $SrAl_2O_4$, $Gd_3Ga_5O_{12}$, $InFeO_3$, $MgIn_2O_4$, $Al_2TiO_5$, $FeTiO_3$, $MgTiO_3$, $NaSiO_3$, $CaSiO_3$, $ZrSiO_4$, $K_2GeO_3$, $Li_2GeO_3$, $Na_2GeO_3$, $Bi_2Sn_3O_9$, $MgSnO_3$, $SrSnO_3$, $PbSiO_3$, $PbMoO_4$, $PbTiO_3$, $SnO_2$—$Sb_2O_3$, $CuSeO_4$, $Na_2SeO_3$, $ZnSeO_3$, $K_2TeO_3$, $K_2TeO_4$, $Na_2TeO_3$, $Na_2TeO_4$ and the like can be used as well and still furthermore, sulfides such as FeS, $Al_2S_3$, MgS, ZnS and the like, fluorides such as LiF, $MgF_2$, $SmF_3$ and the like, chlorides such as HgCl, $FeCl_2$, $CrCl_3$ and the like, bromides such as AgBr, CuBr, $MnBr_2$ and the like, iodide such as $PbI_2$, CuI, $FeI_2$ and the like and metal oxidized nitrides such as SiAlON and the like can be used as well for the insulator layer.

Moreover as a film-formation method for these functional layers, similarly to the above-mentioned embodiment, although especially the sputtering method is effective, there is effective also by a vacuum deposition method, the CVD method, the laser aberration method, the MBE method, and the ion-beam sputtering method.

The material of the semiconductor layer 12 is the same as that of the above-mentioned embodiment.

Similarly to the above-mentioned embodiment, the porous semiconductor layer 13 is obtained after the semiconductor layer 12 is subjected to the anodization processing.

Next, the material of the thin-film metal electrode 15 at the side of electron emission is the same as that of the above-mentioned embodiment.

The material of the ohmic electrode 11 at the side of electron-supply is the same as that of the above-mentioned case of the operation.

The material for the device-substrate 10 on which the semiconductor layer 12 is deposited as a thin-film may be ceramics such as $Al_2O_3$, $Si_3N_4$ or BN instead of glass.

In this way, in the invention, the insulator layer 14 made of silicon oxides or silicon nitrides is deposited by sputtering or CVD on the porous silicon layer formed by the anodization of the silicon layer. This process can facilitate to control the thickness of the silicon oxide or silicon nitride insulator layer.

Figure 8:
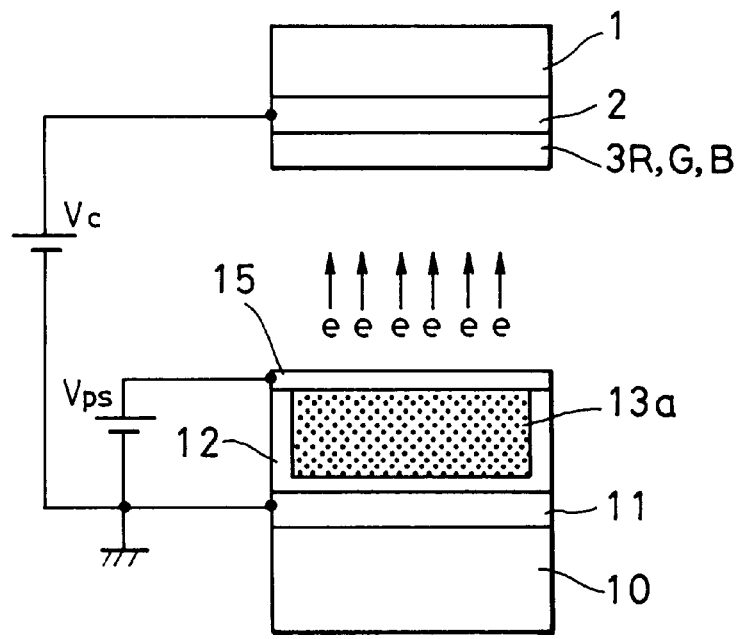

In another embodiment, as shown in FIG. 8, instead of the insulator layer 14, a porous semiconductor layer 13a is provided to the device in which internal skeletons of the porous semiconductor layer are oxidized or nitrided after anodization for making pores on the semiconductor layer. This porous electron emission device demonstrates the same characteristic as the above embodiment. Namely, after the anodization of the silicon layer, dangling bonds of the surface of pore channel not only adjacent to the surface of the porous silicon layer are terminated with atoms of oxygen or nitrogen, but also inner skeletons thereof are oxidized or nitrided. This deep oxidation or nitriding of the porous silicon layer under the following conditions contributes to an improved property similar to that of the above embodiment. For example, the porous silicon layer is subjected to the rapid oxidation or nitriding at a temperature ranging from 900 to 1000 degrees Centigrade for a processing period of form 10 to 70 minutes. After that, for example, it is annealed at 500 degrees Centigrade temperature for 10 minutes in an inertia gas such as Ar. Alternatively, after anodization for making pores on the semiconductor layer, oxidization or nitriding may be performed on the resulted porous semiconductor layer under the following conditions and, after that, the thin-film electrode of metal such as Pt is prepared, so that an emission stability and durability of the device are improved more.

The porous semiconductor layer may be oxidized under the oxidization conditions of a temperature ranging from 700 to 1200 degrees Centigrade and a time period of form 1 to 120 minutes in oxygen gas, alternatively under the oxidization conditions of a temperature ranging from 200 to 900 degrees Centigrade and a time period of form 1 to 120 minutes in oxygen plasma. The porous semiconductor layer may be nitrided under the nitriding conditions of a temperature ranging from 700 to 1200 degrees Centigrade and a time period of form 1 to 120 minutes in nitrogen gas, alternatively under the nitriding conditions of a temperature ranging from 200 to 900 degrees Centigrade and a time period of form 1 to 120 minutes in nitrogen plasma.

Figure 9:
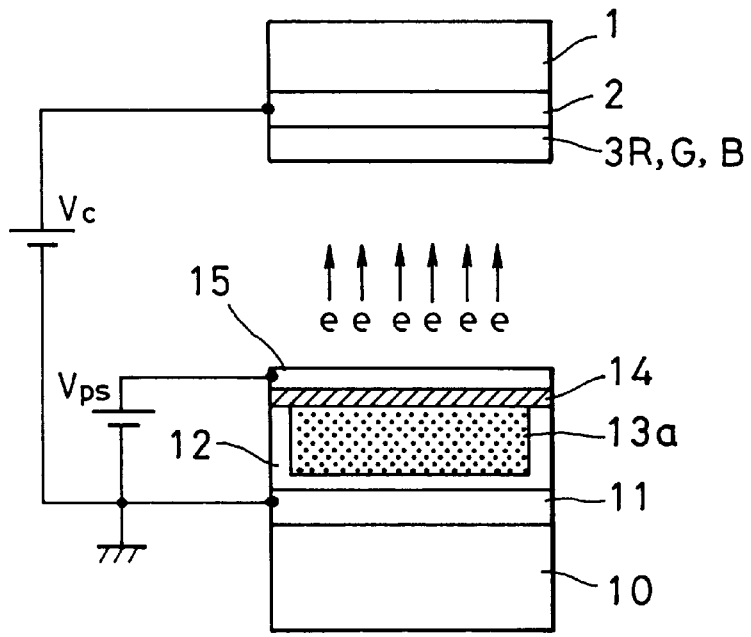

Still further, as shown in FIG. 9, a combination of the insulator layer and the oxidized or nitrided porous semiconductor layer may be preformed in the invention. Namely the electron emission device comprises: a semiconductor layer 12 for supplying electrons; a porous semiconductor layer 13a formed on the semiconductor layer in which inner skeletons of the porous semiconductor layer are oxidized or nitrided; an insulator layer 14 formed on the porous semiconductor layer and made of a material selected from silicon oxide or silicon nitride; and a thin-film metal electrode 15 which is formed on the insulator layer and faces a vacuum space. This electron emission device has also an advantageous effect similar to that of the above embodiment.

(First Example)

Concretely plural electron emission devices according to the invention were fabricated and their characteristics were examined.

In each device, a silicon layer was formed by sputtering, on an electrode surface of a device-substrate of glass on which an ohmic electrode of Al was previously formed by sputtering.

The porous semiconductor layer was obtained from the semiconductor layer anodized under the conditions which is as follows:

(Anodization Conditions)
Electrolytic solution:
  HF(55% solution):Ethanol=1:1
Current density: 12.5 mA/cm$^2$
Illumination of light-energy: Yes
Processing period: 72 seconds
Thickness of the porous semiconductor layer: 2 µm A silicon oxide layer with a 50 nm thickness was formed by sputtering on the porous semiconductor layer after the porous semiconductor layer was obtained by the anodization.

After the formation of the silicon oxide layer, a 6 mm diameter thin-film metal electrode of Pt was formed in 10 nm thick on the silicon oxide layer of each substrate by sputtering, thus providing a plurality of device-substrates.

Meanwhile, transparent substrates were prepared, each of which has a collector electrode of ITO formed inside a transparent glass substrate and has a fluorescent layer of a fluorescent substance corresponding to R, G or B color emission formed on the collector electrode by the normal scheme.

Electron emission devices were assembled in each of which the device-substrate and the transparent substrate are supported apart from one another by 10 mm in parallel by a spacer in such a way that the thin-film metal electrode faced the collector electrode, with the clearance therebetween made to a vacuum of $10_{-5}$ Pa.

(Comparative example)

On the other hands, electron emission devices of comparative examples were produced in the same manner as the above-mentioned embodiment except that no silicon oxide layer is formed.

(Second example)

On the other hands, electron emission devices of comparative examples were produced in the same manner as the above-mentioned embodiment except that skeleton of the porous silicon layer was enough oxidized to the depth of 50 nm after the porous semiconductor layer was formed by the anodization without formation of the silicon oxide layer on the porous silicon layer.

(Results)

Figure 10:
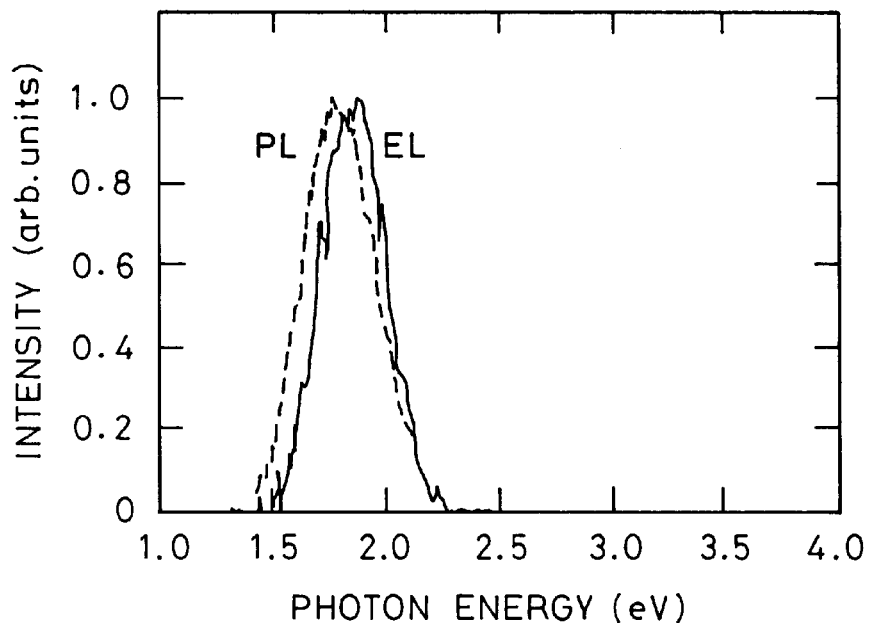
FIG. 10 is a graph illustrating EL and PL light-emission spectrums in the electron emission device according to the invention.

The difference of the electrical properties of the electron emission devices influenced by the silicon oxide layer and the porous silicon layer was observed in the first and second embodiments and comparative examples. As a result, these devices emit electrons. FIG. 10 shows EL and PL light-emission spectrums in the electron emission device according to the invention. In this case, peaks of energy exhibited by the EL and PL light-emission were 1.7 eV respectively.

Then, the diode current Ips (Diode current) and the emission current Iem (Emission current) of each device of the first embodiment and the comparative device were measured, while a driving voltage Vd of from 0 to 20 V was applied across the thin-film metal electrode and the ohmic electrode of a ground potential in each prepared electron emission device.

Figure 11:
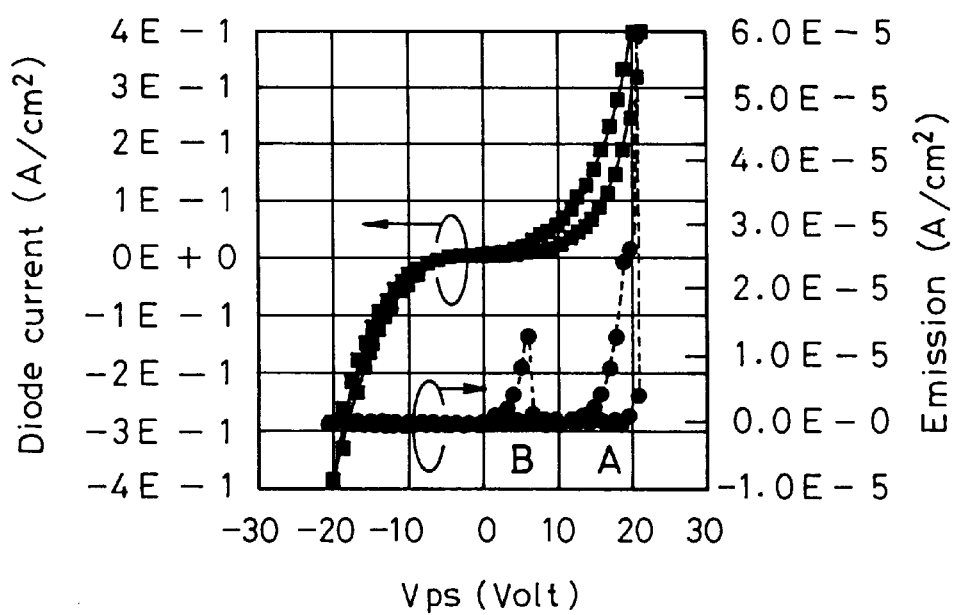
FIG. 11 is a graph illustrating relationships of both the diode current and the emission current with respect to the driving voltage Vps applied for driving the electron emission device according to the invention.

FIG. 11 shows a result of relationship of a diode current and the emission current with respect to the driving voltage of the electron emission device. As seen from this relationship, it is understood that the diode current curves show hysteresis properties in the devices of the first embodiment and the comparative example respectively, but the electron emission device of the first embodiment has a breakdown voltage higher than that of the comparative device. The curve A in the graph denotes the emission current Iem of the first embodiment device. The curve B in the graph denotes the emission current Iem of the comparative device. As seen from these curves, the first embodiment device exhibits a peak of the emission current Iem higher than of the comparative device at about 20 V of Vps, but the low peak of Iem of the comparative device is at several voltages Vps. Therefor the electron emission device of the first embodiment had an emission efficiency higher than that of the comparative device.

What is claimed is:

1. An electron emission device comprising:
  a semiconductor layer for supplying electrons;
  a porous semiconductor layer formed on the semiconductor layer; and a thin-film metal electrode which is formed on the porous semiconductor layer and faces a vacuum space; wherein the porous semiconductor layer has at least two or more of porosity-changed layers which have porosities which are different from each other in the thickness direction, whereby the electron emission device emits electrons when an electric field is applied between the semiconductor layer and the thin-film metal electrode.

2. An electron emission device according to claim 1, wherein the porosity-changed layer with a high porosity and another porosity-changed layer with a low porosity are layered by turns in the thickness direction of the porous semiconductor layer.

3. An electron emission device according to claim 1, wherein the porosity-changed layers have incline porosities ascended or descended gradually in the thickness direction.

4. An electron emission device according to claim 1, wherein the porous semiconductor layer is formed by an anodization processing to the surface of the semiconductor layer to be made as a porous portion.

5. An electron emission device according to claim 4, wherein the semiconductor layer is anodic-oxidized from the surface thereof during a processing time in which a current density for the anodization processing is changed so that the porosity-changed layers have incline porosities in the thickness direction.

6. An electron emission device according to claim 4, wherein the semiconductor layer is anodic-oxidized from the surface thereof in such a manner that a first processing time duration in which a low current density for the anodization processing is applied to the surface and a second processing time duration in which a high current density for the anodization processing is applied to the surface are repeated by turns, so that the porosity-changed layer with a high porosity and another porosity-changed layer with a low porosity are layered by turns in the thickness direction of the porous semiconductor layer.

7. An electron emission device comprising:

a semiconductor layer for supplying electrons;

a porous semiconductor layer formed on the semiconductor layer;

an insulator layer formed on the porous semiconductor layer and made of a material selected from silicon oxide or silicon nitride; and a thin-film metal electrode which is formed on the insulator layer and faces a vacuum space; whereby the electron emission device emits electrons when an electric field is applied between the semiconductor layer and the thin-film metal electrode.

8. An electron emission device according to claim 7, wherein the porous semiconductor layer is formed by a n anodization processing to the surface of the semiconductor layer to be made as a porous portion.

9. An electron emission device according to claim 7, wherein dangling bonds of the porous semiconductor layer are terminated by oxygen or nitrogen.

10. An electron emission device comprising:

a semiconductor layer for supplying electrons;

a porous semiconductor layer formed on the semiconductor layer; and a thin-film metal electrode which is formed on the porous semiconductor layer and faces a vacuum space; wherein skeletons of the porous semiconductor layer are oxidized or nitrided, whereby the electron emission device emits electrons when an electric field is applied between the semiconductor layer and the thin-film metal electrode.

11. An electron emission device according to claim 10, wherein the porous semiconductor layer is formed by an anodization processing to the surface of the semiconductor layer to be made as a porous portion.

* * * * *